United States Patent Office 3,846,223
Patented Nov. 5, 1974

3,846,223
CONDUCTIVE PLASTIC ARTICLE AND METHOD FOR MAKING SAME
Burton E. Lederman, Swarthmore, Pa., and Jack D. Boudrie, Grand Rapids, Mich., assignors to Gulf + Western Industrial Products Company, Salem, Ohio
Filed Aug. 30, 1972, Ser. No. 284,943
Int. Cl. B32b 5/16
U.S. Cl. 161—162                                11 Claims

ABSTRACT OF THE DISCLOSURE

An article of manufacture molded from non-conductive synthetic plastic material has an outer surface with electrically conductive material uniformly or non-uniformly imbedded therein.

BACKGROUND OF THE INVENTION

This application relates to the art of conductive plastics and more particularly to plastic articles which may be electrically charged for electrostatic spray painting.

It is common to electrostatically spray paint articles of manufacture by allowing the article to serve as an electrical ground, while charging the paint with electric potential. Charged particles of paint sprayed toward the article cling tenaciously thereto and produce a uniform coating on the article. Alternatively, the article to be painted may be charged with an electric potential and the atomized paint serves as the ground.

Normally, articles molded of synthetic plastic material are not sufficiently conductive to serve as a ground or be electrically charged with an electrical potential, and electrostatic spray painting is not possible. When it is desired to electrostatically spray paint such articles, a special conductive premix of synthetic plastic material is used to form the article. The conductive premix compound is more expensive than the usual bulk molding compound because as large an amount of inexpensive filler cannot be used. The use of a conductive premix produces a substantially homogenous article which is highly conductive and will accept an electrical potential. The much higher cost of a conductive premix outweighs many of the advantages of being able to electrostatically spray paint the articles.

In another known procedure, non-conductive plastic articles are primed with a prime coat of electrically conductive primer by conventional non-electrostatic techniques. The finish coat is then applied electrostatically. This procedure requires an extra coating step.

The need for using a special conductive premix makes it necessary to store large amounts of different types of premix materials depending upon which type of articles are to be produced.

SUMMARY OF THE INVENTION

A conductive article of manufacture is molded of non-conductive synthetic plastic material and has an outer surface which is conductive.

A small quantity of lower viscosity highly conductive synthetic plastic material is fed through a molding apparatus ahead of a larger quantity of high viscosity synthetic plastic material. The conductive plastic material is of a lower viscosity and forms a conductive coating on the surfaces of the mold and molding machine. Being of a lower density and lower viscosity, the highly conductive plastic material also distributes itself on the outer surface of the non-conductive plastic material. In being fed through the molding machine and into the mold, the non-conductive plastic material becomes smeared on its outer surface with conductive material. The conductive material is usually non-uniformly distributed on the outer surface of the molded article and is visible as a marbeling effect, but in some instances, a relatively uniform coating may result.

Although the molded article is less conductive than an article formed entirely from conductive plastic material, its outer surface is sufficiently conductive to serve as an electrical ground, or accept an electrical potential, for use with electrostatic spray painting apparatus.

The major portion of the molded article is formed from relatively inexpensive and highly filled non-conductive synthetic plastic material. Only the outer surface of the completed article has conductive material integrally distributed thereon.

It is a principal object of the present invention to provide a less expensive conductive article of manufacture formed from synthetic plastic material.

It is also an object of the present invention to provide an improved method for forming a conductive article of synthetic plastic material.

It is a further object of the present invention to provide an improved conductive article which is conductive only on its outer surface and has a main body portion formed of lower cost and highly filled synthetic plastic material.

BRIEF DESCRIPTION OF THE DRAWING

The invention may take form in certain parts and arrangement of parts, a preferred embodiment of which will be described in detail in this specification and illustrated in the accompanying drawings which form a part hereof.

DESCRIPTION OF THE PREFERRED EMBODIMENT

Figure 1:
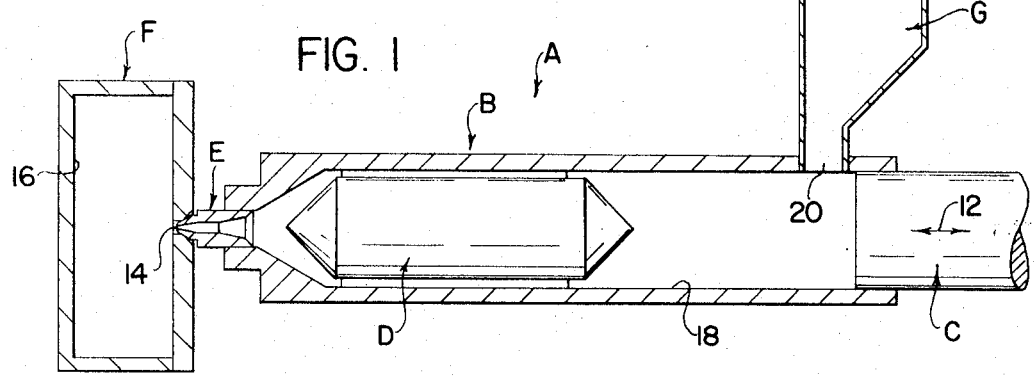
FIG. 1 is a cross-sectional elevational view showing an apparatus for use in carrying out the present invention.

Referring now to the drawings, wherein the showings are for purposes of illustrating a preferred embodiment of the invention only and not for purposes of limiting same, FIG. 1 shows an injection molding apparatus A which includes a cylinder B having a piston C reciprocable therein in the direction of arrows 12. Cylnder B may have a centrally located torpedo spreader D therein for spreading plastic material which is forced through cylinder B by piston C. Cylinder B and torpedo D may be heated by band or cartridge heaters in a known manner for plasticizing synthetic plastic material fed to cylinder B. Cylinder B has an outlet nozzle E communicating with sprue 14 of mold F having a cavity 16 of any desired shape for producing an article of manufacture. A feed hopper G is provided on cylinder B and communicates with interior 18 of cylinder B through inlet opening 20.

It will be recognized that many different types of plastic material and many different types of plastic mixes may be used in carrying out the principles of the present invention. One example of suitable materials will be given and should not be taken in a limiting sense.

LOW COST HIGH VISCOSITY AND HIGHLY FILLED POLYESTER MOLDING COMPOUND

Parts by weight
Low profile, unsaturated, thermosetting polyester resin _____ 100
Tert Butyl Perbenzoate _____ 1.0
Zinc Stearate _____ 3.0
$CaCo_3$ _____ 250
Chopped Glass Fibers _____ 88

LOW VISCOSITY CONDUCTIVE POLYESTER MOLDING COMPOUND

|  | Parts by weight |
|---|---|
| Low profile, unsaturated, thermosetting polyester resin | 100 |
| Tert Butyl Perbenzoate | 1.0 |
| Conductive Carbon | 10 |
| Zinc Stearate | 0.3 |
| Chopped Glass Fibers | 15 |

It will be recognized that it is possible to carry out the principles of the present invention using other plastic material such as epoxy, polyamide or polyvinylchloride. In addition, in some instances it may be possible to use powdered metal as the conductive material instead of conductive carbon.

In accordance with one arrangement, a very small quantity of the conductive material is loaded into cylinder B through hopper G. A much larger amount of the non-conductive material is then loaded into cylinder B through hopper G. It will be recognized that various ratios may be used. However, in a preferred arrangement, the non-conductive material is preferably at least 10 times as great as the conductive material. As the plastic materials melt within cylinder B and move therethrough under force of piston 12, the lower weight and lower viscosity conductive material spreads itself throughout cylinder B and coats internal surface 18 thereof. The highly conductive plastic material also spreads around spreader D and coats the surface thereof. The conductive plastic material does not become uniformly mixed with the non-conductive plastic material and tends to insinuate itself around the outer surface of the non-conductive plastic material. A small amount of the highly conductive plastic material will enter die cavity 16 first and will also coat the wall of cavity 16. The charge of highly conductive plastic material will leave a conductive carbon residue on the internal surfaces of molding apparatus A and mold F. Being of a lower density and lower viscosity, the conductive plastic material will also be distributed on the outer surface of the molded article.

Figure 2:
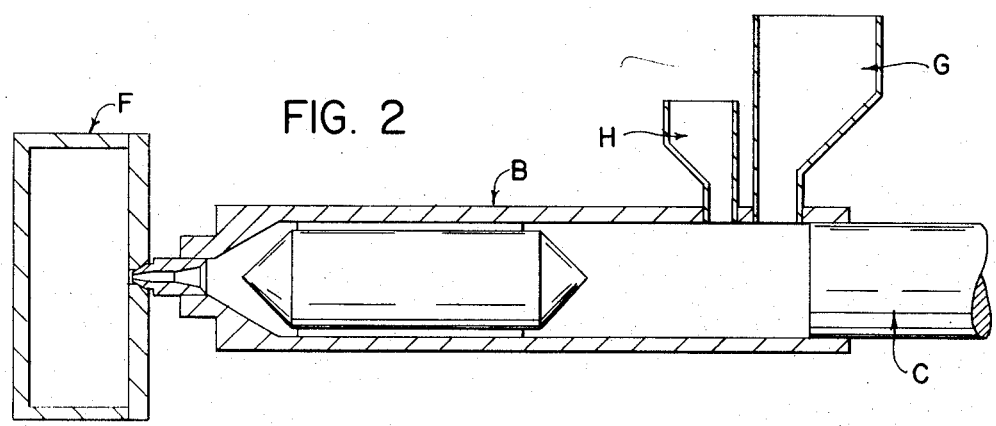
FIG. 2 is a view similar to FIG. 1 and showing a separate charging inlet for conductive material.
Figure 3:
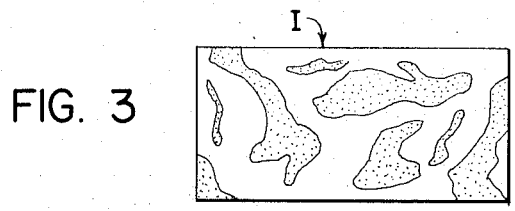
FIG. 3 is a plan view showing a surface of an article molded in accordance with the present invention.

Instead of charging the charging chamber of the molding apparatus with conductive and non-conductive material through the same hopper, it is possible to have a supplemental charging hopper H as shown in FIG. 2. In such arrangement, a relatively small amount of conductive plastic material is fed to the charging chamber through hopper H after each shot while a larger amount of non-conductive material is fed through hopper G.

A completed article I has a substantially homogenous main body portion formed of the described non-conductive plastic material. However, most of the outer surface of article I has conductive carbon distributed thereon and imbedded therein in sufficient quantities to make the surface of article I conductive. Therefore, article I will accept an electrical potential suitable for electrostatic spray painting. For non-conductive plastic material which is other than black in color, the conductive plastic material will be visible on the surface of article I as somewhat of a marbeling effect.

It has been found that the highly conductive plastic material coats the internal surfaces of apparatus A so that subsequent articles molded from non-conductive plastic material still have a conductive outer surface even though additional small charges of conductive plastic material are not fed to the apparatus after every shot. That conductive material which coats the internal surfaces of apparatus A is scraped from such surfaces by successive shots of non-conductive plastic material.

Figure 4:
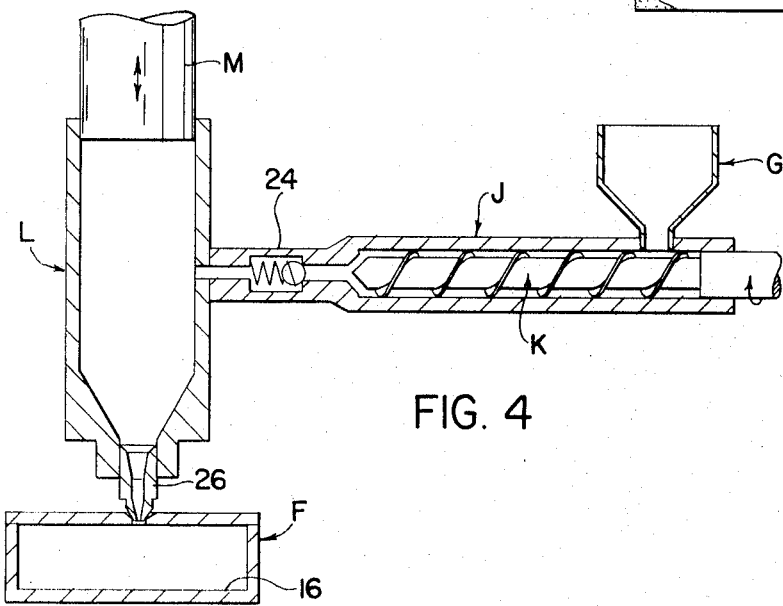
FIG. 4 is a cross-sectional elevational view of another apparatus for use in carrying out the present invention.

FIG. 4 shows another apparatus wherein a charging hopper G feeds plastic material to the interior of a cylinder J having a feed screw K rotatably mounted therein for feeding the plastic material through a ball check valve 24 to injection cylinder L. A reciprocating piston M then forces plastic material from injection cylinder L through nozzle 26 into cavity 16 of mold F. Cylinders J and L are suitably heated as by band or cartridge heaters. A supplemental charging chamber as shown at H in FIG. 2 may also be used with the arrangement of FIG. 4. It will be recognized that it is also possible to use an injection molding apparatus of the reciprocating screw type for carrying out the principles of the present invention.

Mixing a small quantity of the conductive premix into the non-conductive premix prior to charging the molding apparatus will produce a substantially homogenous article having insufficient conductivity for electrostatic spray painting. The arrangement of the present invention concentrates a sufficient quantity of conductive material on the outer surface of the article for good electrostatic spray painting.

With the arrangement of the present invention, it should be recognized that the carbon particles or other conductive material does not simply coat the surface of the article like a csnductive primer applied by conventional techniques. Instead, the carbon particles are imbedded in the plastic surface and integrally molded into the surface of the article. That is, the conductive particles are bonded to the article by having portions thereof integrally molded and bonded into the plastic material at the surface of the article.

Although the invention has been described with reference to a preferred embodiment, it is obvious that equivalent alterations and modifications will occur to others skilled in the art upon the reading and understanding of this specification. The present invention includes all such equivalent alterations and modifications and is limited only by the scope of the claims.

Having thus described our invention, we claim:

1. An article of substantially non-conductive synthetic plastic material having an outer surface with conductive particles molded into and at least partially imbedded within a portion of said outer surface,
    said article being obtained by feeding a first quantity of non-conductive synthetic plastic material and a second, substantially lesser quantity of synthetic plastic material through a molding apparatus including a mold cavity, so that said first and second quantities simultaneously enter said mold cavity,
    said second quantity of material containing said conductive particles distribution therein and having a lower viscosity and lesser density at the time of being fed into said cavity than said first quantity of material, so that said synthetic plastic material containing conductive particles coats parts of said apparatus and thereby is distributed on the outer surface of said non-conductive synthetic plastic material in said mold cavity, and molding said materials into said article which has thereby an outer surface with said conductive particles being present in at least sufficient quantities to render said outer surface sufficiently conductive to serve as an electrical ground.

2. The article of claim 1 wherein said conductive particles comprise carbon.

3. The article of claim 1 wherein said non-conductive synthetic plastic material has in the molten state a first viscosity and first density, and said conductive particles are distributed in a second synthetic plastic material having in the molten state a second viscosity and second density substantially lower than said first viscosity and first density.

4. The article of claim 1 wherein said non-conductive synthetic plastic material comprises a highly filled polyester and said conductive particles are carried in a low filled polyester material.

5. A method of making a plastic article having an outer surface sufficiently conductive to serve as an electrical ground, comprising the steps of; providing a first quantity of non-conductive synthetic plastic material, providing a second quantity, substantially less than said first quantity, of conductive synthetic plastic material, feeding said materials through a molding apparatus, said conductive plastic material being fed to said apparatus as a discrete mass simultaneously with feeding of said non-conductive material, said conductive plastic material in said mold apparatus being of a lower viscosity and lower density then said non-conductive plastic material so that said conductive synthetic plastic material coats surface of said apparatus and is distributed on the outer surface of said non-conductive synthetic plastic material, and molding said materials into an article having an outer surface with said conductive plastic material distributed thereon.

6. The method of claim 5, wherein said surface of said article is sufficiently conductive to serve as an electrical ground for electrostatic spray painting.

7. A method of making a plastic article having an outer surface which contains conductive particles imbedded therein, comprising the step of: feeding a first quantity of non-conductive synthetic plastic material and a second, substantially lesser quantity of synthetic plastic material through a molding apparatus including a mold cavity, so that said first and second quantities simultaneously enter said mold cavity, said second quantity of material containing conductive particles distributed therein and having a lower viscosity and lesser density at the time of being fed into said cavity than said first quantity of material, so that said synthetic plastic material containing conductive particles coats parts of said apparatus and thereby is distributed on the outer surface of said non-conductive synthetic plastic material in said mold cavity, and molding said materials into an article having an outer surface with said conductive plastic material imbedded therein.

8. The method of claim 7, wherein said first and second quantities of synthetic plastic material are simultaneously fed to said molding apparatus.

9. The method of claim 7, wherein the feeding of said molding second quantity of synthetic plastic material into said apparatus is interrupted while said first quantity of synthetic plastic material is fed therein to scrape previously introduced synthetic plastic material containing conductive particles from the surfaces of said apparatus.

10. The method of claim 7, wherein sufficient conductive particles are introduced within the surface of said article to render the surface of said article sufficiently conductive to serve as an electrical ground.

11. The method of claim 10, wherein the surface of said article is rendered sufficiently conductive to serve as an electrical ground for electrostatic spray painting.

References Cited

UNITED STATES PATENTS

| | | | |
|---|---|---|---|
| 3,416,992 | 12/1968 | Amos | 264—105 X |
| 3,644,132 | 2/1972 | Gelin | 117—93.4 R |
| 2,996,764 | 8/1961 | Ross et al. | 264—328 X |
| 2,174,779 | 10/1939 | Delorme | 264—75 X |
| 2,761,854 | 9/1956 | Coler | 264—104 |
| 3,708,387 | 1/1973 | Turner et al. | 161—168 |
| 3,728,427 | 4/1973 | Thompson | 161—162 X |
| 3,733,385 | 5/1973 | Reddish | 252—511 X |
| 3,745,507 | 7/1973 | Ishida et al. | 252—511 X |
| 3,585,102 | 6/1971 | Burgess | 161—168 X |

OTHER REFERENCES

Garner: Def. Pub. Search Copy of Serial No. 202,458, published in 869 O.G. 687, on Nov. 7, 1972, Defensive Publication T904,007, 264/255.

GEORGE F. LESMES, Primary Examiner

S. S. SILVERMAN, Assistant Examiner

U.S. Cl. X.R.

117—93.4 R, 93.4 A, 212, 226; 161—164, 166; 252—511, 512; 264—104, 105, 328, 245, 255